United States Patent

[11] 3,575,336

[72] Inventor Franklin W. Booth
 Hampton, Va.
[21] Appl. No. 777,764
[22] Filed Nov. 21, 1968
[45] Patented Apr. 20, 1971
[73] Assignee the United States of America as represented by the Administrator of the National Aeronautics and Space Administration.

[54] SOLDERING DEVICE
 3 Claims, 5 Drawing Figs.
[52] U.S. Cl. .................................................. 228/53,
  219/229
[51] Int. Cl. ..................................................... B23k 3/04
[50] Field of Search ............................................ 228/51, 52,
  53; 219/229

[56] References Cited
UNITED STATES PATENTS
1,457,508 6/1923 Dellman ....................... 228/53
1,626,552 4/1927 Quillen ......................... 228/52
2,462,131 2/1949 Rustin .......................... 228/53
2,491,165 12/1949 De Rugeris .................... 228/53
3,443,734 5/1969 Fortune ........................ 228/52
3,484,033 12/1969 Sachs ........................... 228/51
FOREIGN PATENTS
533,005 2/1941 Great Britain ................. 228/52

Primary Examiner—John F. Campbell
Assistant Examiner—Ronald J. Shore
Attorneys—Howard J. Osborn, John R. Benefiel and G. T. McCoy ABSTRACT: A soldering tool and method which utilizes controlled capillary attraction of the solder and the tool to regulate solder flow into and out of the tool tip and on and off the workpieces.

Patented April 20, 1971 3,575,336
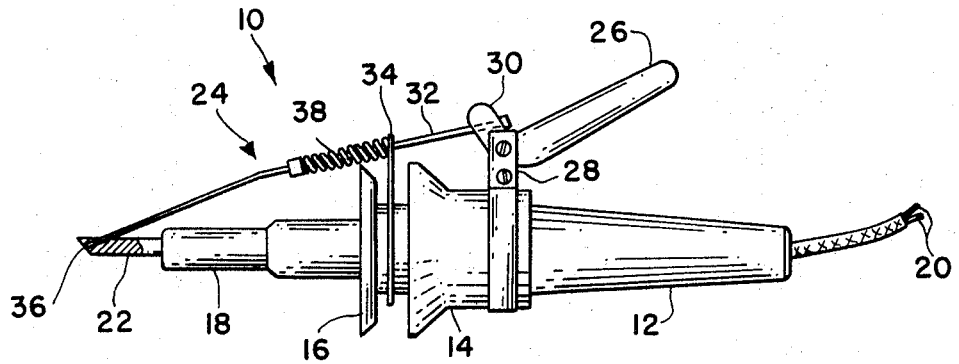
FIG. 1
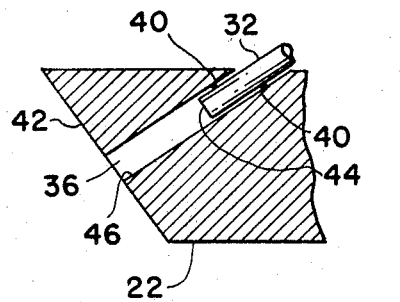 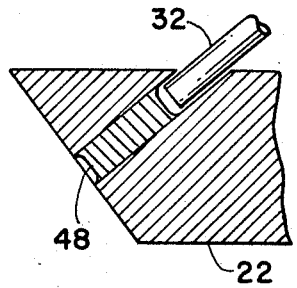 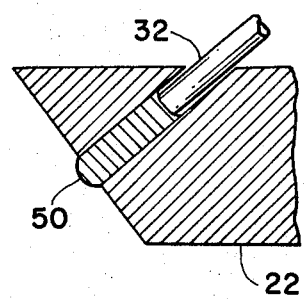
FIG. 2  FIG. 3  FIG. 4
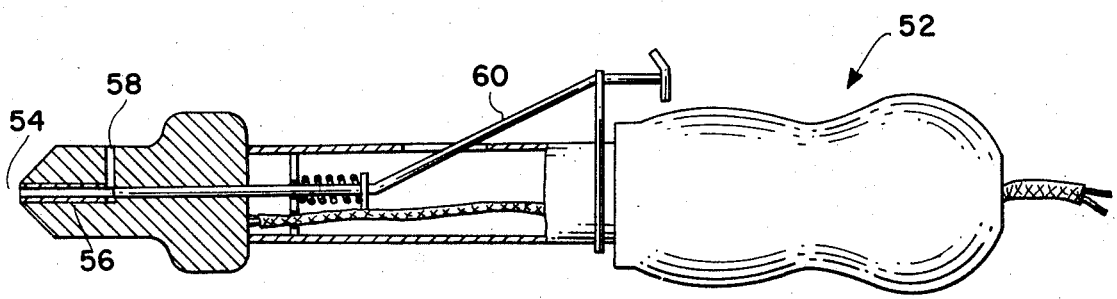
FIG. 5
INVENTOR.
FRANKLIN W. BOOTH
BY
John R Benefiel
ATTORNEYS

SOLDERING DEVICE

The invention described herein was made by an employee of the U.S. Government and may be manufactured and used by or for the Government of the United States of America for governmental purposes without the payment of any royalties thereon or therefor.

This invention relates to a soldering device which is particularly suited to making high-quality wiring joints such as are necessary in aerospace work.

Prior art devices have long sought to provide precise control over the flow of solder onto and off the pieces to be soldered, in order to attain a reasonable working speed and to avoid excess solder deposits on the joints, and also to maintain uniform solder deposits. Other devices have also been developed to remove excess solder from joints or to remove solder when disconnecting soldered joints. These prior art devices usually relied on various suction arrangements, or solder reservoirs with a valve control.

In general, these devices suffer from the drawbacks of relative complexity and the lack of sufficiently precise control over solder flow necessary for uniformly tinned connections.

Therefore, it is an object of the present invention to provide a simple soldering device which can yield uniformly proper solder deposits on soldered connections.

It is a further object to provide a method of soldering a connection so as to produce uniformly perfect joints.

It is another object to provide a simple device for precisely controlling solder flow on and off a connection.

Basically, these objects are accomplished by providing controlled capillary attraction of the solder and the soldering device by use of a solder wettable passage in the device.

FIG. 1 shows in partial section a soldering device according to the present invention.

FIG. 2 shows an enlarged view of a partial section of the tip of the device shown in FIG. 1.

FIG. 3 shows an enlarged partial section of a tip charged with solder and with the control wire inactive.

FIG. 4 shows an enlarged partial section of a tip with the control wire activated.

FIG. 5 shows a partial section an alternate form of the invention.

Referring to FIG. 1, 10 indicates a soldering device suitable for connecting wires, etc., in general electronic work. This device may be of conventional construction in most regards, having a handle 12, insulator 14, radiation shield 16, heating element 18 supplied with electric power through lines 20, and a working tip 22.

This device is nonconventional in that a solder control arrangement 24 has been added. This arrangement is composed of a control lever 26, which may be rotatably connected to tool 10 by means of a bracket 28. Secured to an arm 30 of the lever 26 is a control wire 32, which passes through a bracket 34 and into a passage 36 bored in the tip 22. A spring 38 biases the assembly so as to cause the control wire to advance into the passage 36 when the lever 26 is released.

In FIG. 2, the details of the tip 22 and control wire 32 assembly are shown. The control wire 32 is undersize so as to loosely fit in the bore 36 with a clearance 40. The face 42 of tip 22 and the end wall 44 of the passage 36 is made to be solder wettable, as by means of an internal rosin flux coating.

In use, power is supplied to the heating element 18, the tip is brought up to temperature, and while restraining the lever 26 so as to withdraw control wire 32, solder is brought into contact with the face 42 and passage 36 of the tip 22 in order to raise its temperature to the melting point. Since the interior surface 46 is solder wettable, capillary action will affect any solder liquified and cause it to rise up into the passage 36 as shown in FIG. 4. The free movement of the solder is aided by the venting of air through the clearance 40 between the wire 32 and the passage 36. The level 50 which it will rise depends on the particular contact angle between the solder and wall 46, the diameter of the opening, and other known factors as is well established from the application of general scientific principles concerning the phenomenon of surface tension.

The soldering device is then in the charged state, having a quantity of liquid solder 48 contained in the tip. The joint to be soldered is heated with the tip and coated with a rosin flux. The lever 26 is then released to allow the control wire 32 to advance as shown in FIG. 4 so as to cause the solder to protrude slightly at 50. By touching this protrusion to the wires to be soldered, the attraction of solder for these wires overcomes the capillary forces to some extent and causes the solder to flow out onto the joint. However, once the joint has been coated, the attractive forces are considerably lessened, and capillary forces reassert themselves on the solder and prevent any additional flow, thus producing a uniformly perfect joint, without any excess solder deposits.

As is known from the scientific principles concerning capillarity, the size of the passage, the angle of the passage, the contact angle, may be varied so that the capillary forces are developed of the proper magnitude so as to be overcome by the initial attraction for the joint, in order to provide the proper coating for the size of the members involved, as well as to provide a sufficiently quantity of solder. A 1/16-inch I.D. passage has proved to be satisfactory for general electronic work.

An alternative arrangement is shown in FIG. 5, where 52 indicates another device according to the present invention. In this form, a concentric passage 54 is formed in the tip, with a solder wettable insert 56 lining this passage. A vent 58 is provided instead of a clearance gap between the control rod 60 and the passage 54, to allow free movement of the solder in and out of the tool.

This arrangement provides a greater potential solder capacity for more massive joints.

From the above description, it can be seen that an extremely simple device has been provided which is capable of producing uniformly perfect joints without relying on operator skill by balancing fluid-attractive forces between the joint and the tool.

In addition, a simplified solder removal tool has been provided which does not require auxiliary suction assists, but relies on capillary forces alone.

I claim:

1. A soldering tool comprising:
   a tip member;
   a passage formed in said tip having walls which are solder wettable and opening onto the surface of said tip member;
   heater means for heating said tip member to the melting point of solder;
   means for venting said passage to allow free movement of solder into said passage due to capillary forces; and
   control means for selectively counteracting said capillary forces and causing solder deposited in said passage to protrude above the surface of said tip member, whereby contact of contained solder with members to be connected may be facilitated.

2. The tool of claim 1 wherein said control means includes a control member slidably inserted in said passage.

3. The tool of claim 2 wherein said vent means includes means providing considerable clearance between said control member and said passage, and also including another opening to the surface of said tip in communication with said passage.